(12) United States Patent
Ognibene (10) Patent No.: US 9,393,992 B2
(45) Date of Patent: Jul. 19, 2016

(54) STEERING SYSTEM FOR HEAVY VEHICLES

(71) Applicant: OGNIBENE POWER S.P.A., Reggio Emilia (RE) (IT)

(72) Inventor: Claudio Ognibene, Reggio Emilia (IT)

(73) Assignee: OGNIBENE POWER S.P.A., Reggio Emilia (RE) (IT)

(*) Notice: Subject to any disclaimer, the term of this patent is extended or adjusted under 35 U.S.C. 154(b) by 0 days.

(21) Appl. No.: 14/593,498

(22) Filed: Jan. 9, 2015

(65) Prior Publication Data
US 2015/0203150 A1 Jul. 23, 2015

(30) Foreign Application Priority Data

Jan. 17, 2014 (IT) .............................. RE2014A0003

(51) Int. Cl.
*B62D 5/065* (2006.01)
*B62D 5/32* (2006.01)
*B62D 5/00* (2006.01)
*B62D 5/097* (2006.01)
*B62D 15/02* (2006.01)

(52) U.S. Cl.
CPC *B62D 5/32* (2013.01); *B62D 5/003* (2013.01); *B62D 5/005* (2013.01); *B62D 5/097* (2013.01); *B62D 15/0245* (2013.01)

(58) Field of Classification Search
CPC .... B62D 5/0406; B62D 5/0415; B62D 5/005; B62D 5/006; B62D 5/097
USPC ......... 180/403, 402, 405, 406, 407, 443, 444, 180/441
See application file for complete search history.

(56) References Cited

U.S. PATENT DOCUMENTS

| 5,234,070 | A | 8/1993 | Noah et al. |
| 6,612,393 | B2 * | 9/2003 | Bohner .................... B62D 5/06 180/402 |
| 6,929,086 | B1 * | 8/2005 | Husain ................... B62D 5/003 180/402 |

(Continued)

FOREIGN PATENT DOCUMENTS

| EP | 0556082 A1 | 8/1993 |
| EP | 2199184 A2 | 6/2010 |
| WO | 03055732 A1 | 7/2003 |

OTHER PUBLICATIONS

European Extended Search Report issued Jun. 18, 2016, of the European Patent Application 15150449.5 corresponding to U.S. Appl. No. 14/593,498.

*Primary Examiner* — Joseph Rocca
*Assistant Examiner* — Marlon Arce
(74) *Attorney, Agent, or Firm* — Volpe and Koenig, P.C.

(57) ABSTRACT

A steering system (10) includes a steering wheel (310), a steering column (30), provided with a first portion (31) associated to the steering wheel (310) and on which a first angular position sensor (316) is positioned, and a second portion (32), on which a second electric motor (325) and a second angular position sensor (326) are positioned, and a clutch (33) interposed between the first portion (31) and the second portion (32). The second portion (32) is associated to a hydrostatic steering unit (40) able to command a steering of a vehicle following a rotation imparted on the steering wheel (310) selectively by means of activating the second electric motor (325) when the clutch (33) is open or directly by means of the clutch (33) when the clutch is closed.

13 Claims, 3 Drawing Sheets

(56) References Cited

U.S. PATENT DOCUMENTS

| | | | |
|---|---|---|---|
| 7,007,769 B2 * | 3/2006 | Hara | B62D 5/003 180/402 |
| 7,604,083 B2 * | 10/2009 | Chino | B62D 1/163 180/402 |
| 8,175,772 B2 * | 5/2012 | Onuma | B62D 6/007 180/402 |
| 8,224,525 B1 * | 7/2012 | Rapoport | A01B 69/007 180/204 |
| 9,022,167 B2 * | 5/2015 | Park | B62D 5/065 180/405 |

* cited by examiner

STEERING SYSTEM FOR HEAVY VEHICLES

FIELD OF THE INVENTION

The present invention relates to a steering system for vehicles, in particular a steering system known as "steer by wire" for steering vehicles, for example heavy vehicles.

BACKGROUND

As is known, steering systems for vehicles generally comprise a steering wheel able to activate in rotation a steering column, which, in turn, following rotation imposed by the steering wheel, imparts steering on the vehicle wheels.

Generally, in particular in heavy vehicles, such as agricultural tractors, a hydrostatic steering unit is used, which facilitates the vehicle steering and makes the steering maneuver easier.

In practice, the hydraulic power steering system, of known type, also known as Orbitrol, generally comprises a gerotor which is connected to the base of the steering column activated by the steering wheel and is such as to send oil into one or more hydraulic pistons connected to the hubs of the wheels and thus command steering thereof as a function of the rotation imposed on the steering wheel.

In heavy vehicles, the cubic capacity of the hydraulic piston which acts on the hubs of the wheels is necessarily very high, for example around 1000 cc.; therefore the cubic capacity of the hydraulic power steering system that has to actuate the hydraulic piston must also exhibit a high cubic capacity so as to enable displacement of a sufficient quantity of fluid (for filling the chambers of the hydraulic piston) with a relatively modest number of revolutions of the steering wheel.

In cases of faults or malfunctioning, the manual rotation of the steering wheel is the only force responsible for activating the hydraulic power steering which transforms into a pump. The activating of hydraulic power steering systems of large cubic capacity is very hard for the operator and the steering is effectively inhibited.

In the attempt to obviate these drawbacks, when a large cubic capacity of the hydraulic power steering is required, a hydraulic system with two gerotors is used, in which during the normal advancement step the gerotors are substantially connected and guarantee the ideal cubic capacity, while in a case of malfunctioning or faults they are disconnected and the operator, by rotating the steering wheel, commands one alone which thus enables steering the vehicle.

A further drawback which is encountered in steering systems with hydrostatic steering units is that the position of the spokes of the steering wheel is never defined and fixed with respect to the reference position which they should have according to their design; in practice the position of the steering wheel is never fixed with respect to the position of the wheels being steered.

In practice, it has been found that in a first step, with the vehicle wheels in a straight direction, the spokes of the steering wheel are in a first reference position, while following use of the steering system when the wheels are returned to the straight position, the spokes of the steering wheel are orientated differently with respect to the first reference position, by a quantity which is not predictable and variable in the presence fluid-dynamic leakage of the hydraulic power steering system.

In this situation, therefore, it has been found that the spokes of the steering wheel, due to the uncertainty and indetermi­nateness of the position thereof, do not enable easy viewing of the control panel, for example provided with monitoring instruments of the state of functioning of the vehicle and/or of an instrument fascia of the commands when positioned behind the steering wheel; further, for this reason, contrarily to what occurs in motor cars, there are no logos or writings identifying the vehicle manufacturer on the steering wheel, or any other writing, as in use they would frequently be upside-down, even with the wheels in a straight configuration.

Other types of steering systems, known as "steer by wire", include mechanically disconnecting the steering column from the steering lever mechanisms of the wheels and del­egating the translation of the rotations imposed on the steer­ing wheel to an electrical actuator which, commanded by an electronic control unit attached to an angular position sensor placed on the steering column, activates the wheel-steering lever mechanisms according to a predetermined and settable transmission ratio which can vary also according to some functioning parameters of the vehicle, such as for example the advancing velocity thereof, the advancement direction or other presettable parameters.

To manage a fault or malfunctioning of the electrical part, to continue functioning correctly in an emergency, these steer by wire mechanisms require appropriate backups both for the electrical actuators and for the supply batteries, with a con­sequent increase in system costs.

An aim of the present invention is to obviate the above-mentioned drawbacks of the prior art, with a solution that is simple, rational and relatively inexpensive and which pre­serves the advantages of the steering system with a hydrauli­cally-assisted steering system, among which the manageabil­ity of the vehicle even in a case of faults or malfunctioning of the electronic command board, and at the same time can exhibit all the advantages of the "steer by wire" systems, among others a correct positioning of the steering wheel into the zero position and a settable manoeuvring comfort of the steering wheel, for example variable according to the func­tioning parameters of the vehicle.

These aims are attained by the characteristics of the inven­tion as reported in the independent claim. The dependent claims delineate preferred and/or particularly advantageous aspects of the invention.

SUMMARY

The invention in particular discloses a steering system comprising a steering wheel, a steering column, provided with a first portion associated to the steering wheel and on which a first angular position sensor is positioned, and a second portion, on which a second electric motor and a sec­ond angular position sensor is positioned, and a clutch inter­posed between the first portion and the second portion, which clutch is normally open.

According to the invention, the second portion is associ­ated to a hydrostatic steering unit able to command a steering of a vehicle following a rotation imparted on the steering wheel selectively by means of activating the second electric motor when the clutch is open or directly by means of the clutch (which solidly constrains the first portion and the sec­ond portion of the steering column in rotation) when the clutch is closed.

With this solution, it is possible to attain the advantages of a steer by wire system in normal operation of the vehicle while at the same time maintaining the possibility of a manual steering, even with heavy vehicles, in situations of system failure.

In particular a transmission ratio is possible between the first portion and the second portion of the steering column which ratio is variable or configurable according to requirements, with a consequent possibility of varying the dimensioning of the hydrostatic steering unit (hydraulic power steering system) commanding the steering as needed.

For hydrostatic steering unit is intended an hydraulic (hydrostatic) steering group which controls the movement of the steering actuator without any mechanical connection (i.e. without mechanical transmissions or hard mechanical connections) between the steering column and the steering actuator.

In an aspect of the invention, the hydrostatic steering unit further comprises at least a command unit of the steering comprising a single gerotor able to supply a fluid into at least a hydraulic piston commanding the steering of the vehicle.

With this solution, the hydrostatic steering unit, which in normal use is commanded by the rotation of the second portion of the steering column commanded by the second electric motor with a multiplication factor settable as required with respect to the rotation of the steering wheel, is particularly simple and economical and at the same time functional.

The command unit advantageously has a cubic capacity not greater than 125 cc.

With this solution it is possible to guarantee manual activating in safety of the steering system also in failure conditions and at the same time, as the first portion of the steering column is deconstrained in rotation from the second portion when the clutch is open, it is possible to activate the second portion in rotation according to a desired multiplication factor so as to guarantee a large displacement of fluid by means of the command unit (undersized) having a modest cubic capacity.

When the clutch is closed, the steering column, substantially constituted by the solid constraint of the first portion and the second portion, activates the gerotor in rotation via a direct mechanical connection, which as it is of modest dimensions will offer a resistance to torque to the steering wheel of less than 120 Nm, for manual command of the steering.

In an advantageous embodiment the hydraulic piston is a double-acting piston and comprises a pair of chambers which can be filled selectively following a respective clockwise rotation and an anti-clockwise rotation of the second portion of the steering column.

In the field of application of heavy vehicles, the hydraulic piston advantageously has a cubic capacity comprised between 800 cc and 2000 cc.

Therefore, the filling of the chambers (right and left) via the gerotor of the command unit can be done following a number of revolutions of the gerotor that is multiple (more than 1) of the cubic capacity of the gerotor, independent of the number of revolutions of the steering wheel when the clutch is open.

The system advantageously comprises an electronic control unit operatively connected at least to the first angular position sensor and to the second electric motor.

For example, the electronic control unit is configured such as to command the activating of the second electric motor so as to rotate the second portion as a function of a manual rotation of the first portion of the steering column imparted on the steering wheel.

In a further aspect of the invention the system comprises a first electric motor on the first portion of the steering column.

The electronic control unit is operatively connected to the first electric motor and configured so as to generate a differentiated mechanical resistance to rotation of the first portion as a function of at least a functioning parameter of the vehicle.

With this solution the resistant torque acting on the steering wheel as a function of the vehicle operating parameters can be varied, for example the advancement velocity over the terrain, the bumpiness of the ground being crossed or other design parameters, thus increasing the vehicle drive comfort.

Alternatively or additionally, the electronic control unit is operatively connected to the first electric motor and configured so as to command the first electric motor to rotate the steering wheel with respect to a predetermined zero position corresponding to the non-steered position of the wheels of the vehicle.

The electronic control unit is advantageously configured so as to command the first electric motor to return the steering wheel into a predetermined zero position when the vehicle wheels are in a non-steered position, for example in a forward motion or reverse motion of the vehicle or only during one of the two advancement directions according to needs.

With this solution a zero position can be determined which remains fixed during the whole working life of the vehicle.

Further, it can be that in determined conditions (for example preferably but not limitedly in conditions of reverse motion of the vehicle) the electronic control unit commands the automatic realignment of the wheels (by means of the second electric motor) and at the same time of the steering wheel (by means of the first electric motor).

Consequently to the fact that the zero position of the steering wheel remains fixed over time, an identifying logo can be placed on the steering wheel, representing the vehicle marque and facing towards the driver position when the steering wheel is in the angular zero position and the logo is always correctly positioned each time the steering wheel is returned into the zero position (with straight wheels).

Further, the system comprises, on the first portion, a torque sensor which for example is operatively connected to the electronic control unit for commanding the steering of the vehicle wheels by means of activating the second electric motor.

With this solution it is possible to monitor/set the coupled acting on the steering wheel during use; for example it enables monitoring an eventual detachment of the operator's hands from the steering wheel.

The system advantageously comprises a detection sensor of the steering angle of the vehicle wheels, for example also operatively connected to the electronic control unit for commanding the steering of the wheels of the vehicle by means of activating the second electric motor.

With this solution it is possible to monitor and make available the real positioning of the wheels punctually, and control the effective efficiency of the steering system or vary and/or correct the steering parameters (for example the rotation angle of the second portion of the steering column) punctually if the real steering of the wheels moves away from the expected steering, as well as command realignment of the vehicle wheels in determined circumstances, such as when the operator removes his or her hands from the steering wheel and/or when the vehicle is reversing, or another settable circumstance.

BRIEF DESCRIPTION OF THE DRAWINGS

Further characteristics and advantages of the invention will emerge from a reading of the description that follows, provided by way of non-limiting example, with the aid of the figures of the accompanying tables.

DETAILED DESCRIPTION OF THE PREFERRED EMBODIMENTS

With particular reference to the figures, 10 denotes in its entirety a steering system for vehicles, particularly though not limitedly, a steering system of slow-moving heavy vehicles, for example which cannot advance at a velocity of greater than 60 km/h, i.e. heavy duty vehicles such as agricultural tractors or self-propelling work vehicles or the like.

The steering system 10 comprises an internally-hollow tubular casing 20, in which a steering column 30 is inserted at a base of which a hydrostatic steering unit 40 is associated, fixed to the base of the tubular casing 20, for example by screws.

The system 10 comprises a steering axle 50 which comprises a cross-member for rigid support (not shown), at opposite ends of which two hubs are rotatable associated with respect to a horizontal axis, which two hubs support respective wheels 51 destined to function as ground rests for the vehicle.

Each hub is hinged to the end of the support cross-member by means of a respective joint able to rotate the hubs with respect to a substantially vertical steering axis.

A steering lever mechanism 52 is hinged to each hub.

The system 10 comprises a hydraulic cylinder 53 (one or more according to requirements) connected to the steering lever mechanism 52 for oscillating the hubs (and therefore the wheels 51) with respect to the steering axis thereof.

The hydraulic cylinder 53 of the example is a double-acting cylinder.

The hydraulic cylinder 53 comprises a cylindrical jacket 531 in which a piston 532 slides, thus subdividing the internal volume of the cylinder jacket into two chambers.

The piston 532 is rigidly connected to a stem 533 with the ends connected to the steering lever mechanisms 52 of each hub.

The cylindrical jacket 531 comprises a passage opening 534 of the fluid opening into each chamber into which the internal volume of the cylindrical jacket is subdivided.

A detection sensor 520 of the steering angle is positioned on at least one of the steering lever mechanisms 52, which detection sensor 520 defines the exact steering angle of the wheels 51 with respect to a predetermined angular reference position, which reference position is for example settable at the position in which the wheels are straight, i.e. perpendicular to the longitudinal axis of the axle 50 (and for example to the hydraulic cylinder 53).

In particular, the hydraulic hydrostatic steering unit 40 is a steering unit used in low-speed vehicles which driving speed does not exceed 60 km/h, such as: building machines, fork-lift trucks, harvesting machines, off-highway equipment and others. These hydraulic hydrostatic steering units amplify the torque to the steering wheels, without hard mechanical connections between the steering column 30 and the hydraulic cylinder 53 which commands the steering lever mechanisms 52.

Figures 1, 2, 3:
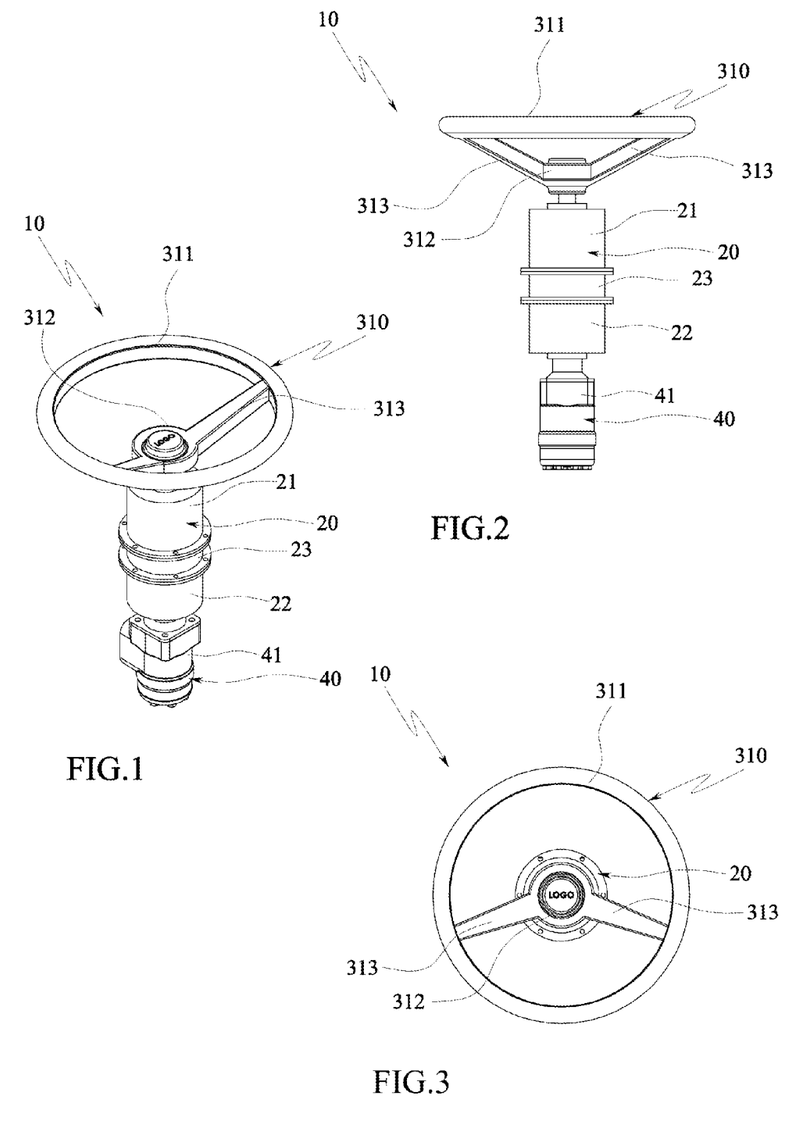
FIG. 1 is an axonometric view of a steering system according to the invention.
FIG. 2 is a front view of FIG. 1.
FIG. 3 is a view from above of FIG. 1.
Figure 4:
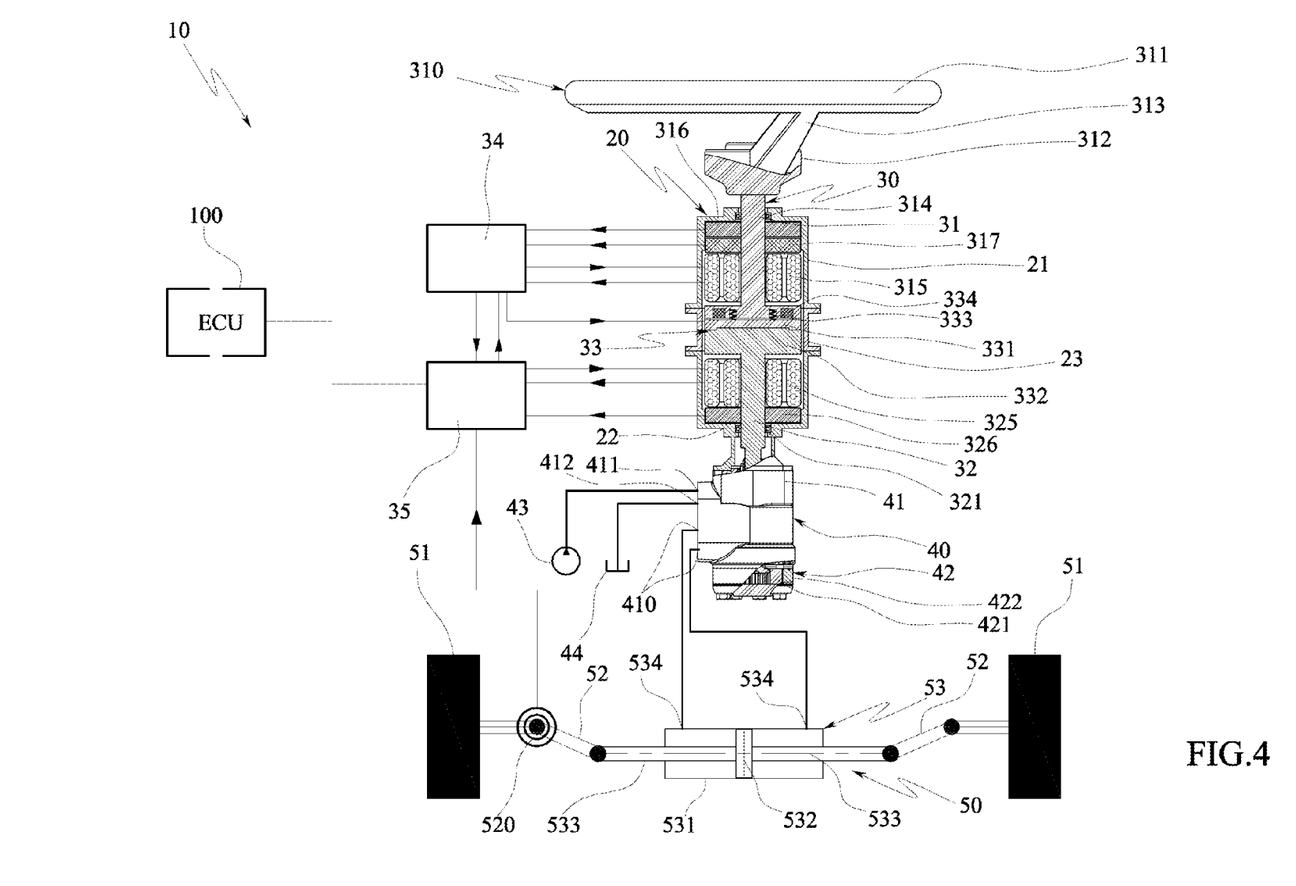
FIG. 4 is a lateral view of the system of FIG. 1, partially sectioned with the clutch closes and complete with a schematic view of the steering axle commanded thereby.
Figures 5, 6:
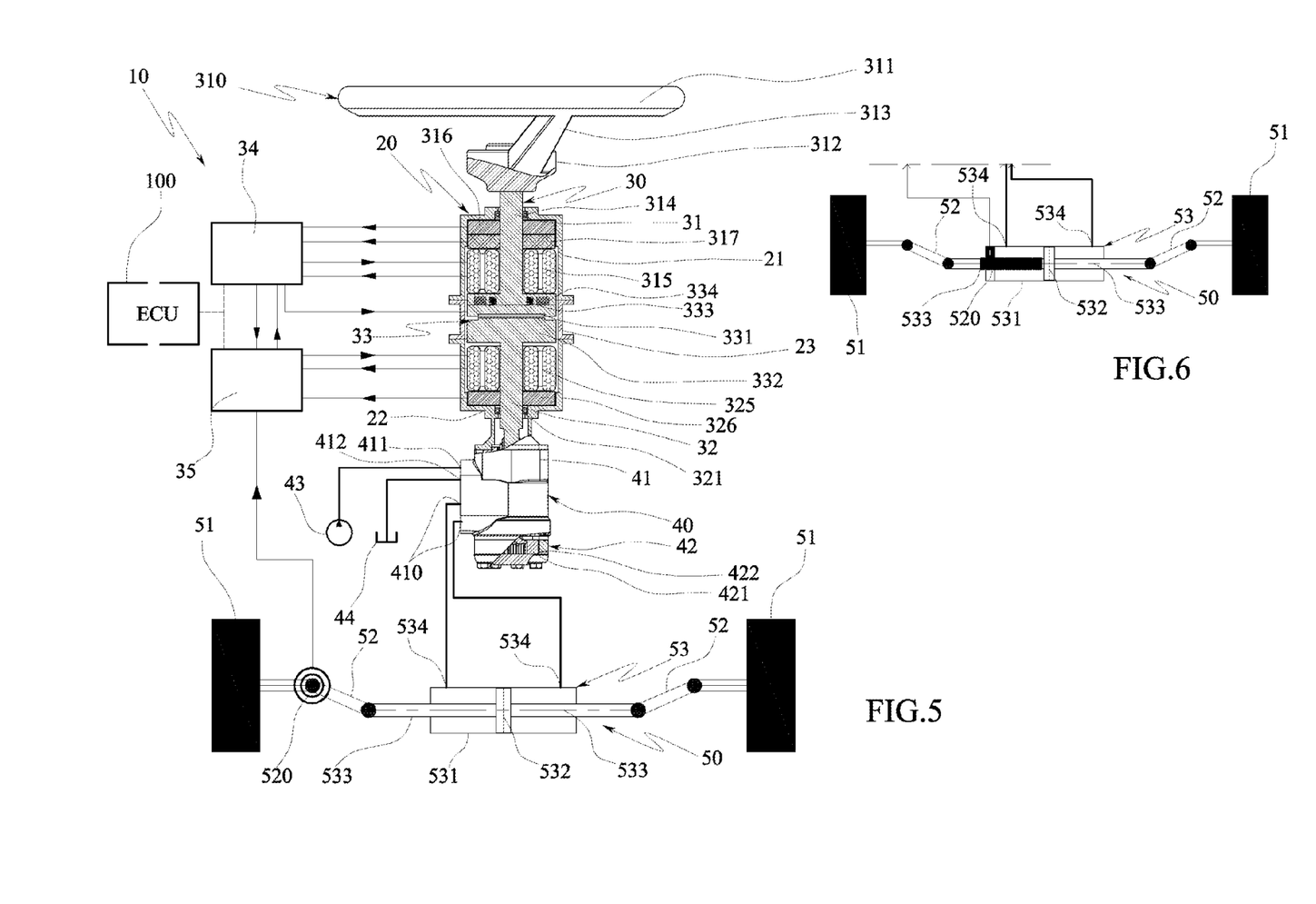
FIG. 5 is the view of FIG. 4 with the clutch open.
FIG. 6 is an alternative embodiment of the steering axle of FIGS. 4 and 5.

Equivalently, as shown in FIG. 6, alternatively to the detection sensor 520 of the steering angle, there could be present a linear detection sensor 520 of the displacement of the piston 532, for example associated to the cylindrical jacket 531 and able to read off the position of the stem 533.

The tubular casing 20 is for example inserted in a special seating in the vehicle cabin, for example on the dashboard thereof, for example in such a way as to be solidly fixed thereto or coupled thereto by means of sliding couplings such as to slide along the longitudinal axis thereof in order to be height-regulated.

The tubular casing 20, in the example, comprises a first upper portion 21 substantially cup-conformed with a concavity facing downwards and a coaxial second lower portion 22, also cup-conformed with a concavity facing upwards.

The tubular casing 20 illustrated further comprises a central portion 23, substantially tubular, coaxial to the first upper portion 21 and to the second lower portion 22 and able to connect them.

The steering column 30, for example, comprises a first upper portion 31 projecting superiorly from the tubular casing 20 and fixed to a steering wheel 310 which can command the rotation of the steering column 30, as will emerge more clearly from the following.

In practice the steering wheel 310 comprises a toroidal body 311, grippable by a user, which is fixed to a concentric annular or disc-shaped body 312 having a smaller diameter by means of one or more spokes 313 (two in the illustrated example).

A writing or logo (printed or applied or in any case fixed) can be applied on the steering wheel 310, at the annular or disc-shaped body 312 position.

The first upper portion 31 of the steering column 30 is inserted in a central hole afforded in the top wall of the first upper portion 21 of the tubular housing 20 and rotatably supported by a first bearing 314.

The steering column 30, for example, comprises a second lower portion 32 projecting inferiorly from the tubular housing 20 which enters the hydraulic power steering system 40 to command the drive, as will become apparent hereinafter.

The second lower portion 32 of the steering column 30 is inserted in a central hole afforded in the bottom wall of the second lower portion 22 of the tubular housing 20 and rotatably supported by a second bearing 321.

The first upper portion 31 and the second lower portion 32 are mutually associated by means of a clutch 33, for example an electromagnetic clutch.

The clutch 33 comprises a first cogged disc 331 with the frontal teeth solidly associated in rotation coaxially to the free end (bottom) of the first upper portion 31 of the steering column 30 and a second cogged disc 332 with frontal teeth solidly associated in rotation, coaxially, to the free end (upper) of the second lower portion 32 of the steering column 30.

At least one from between the first cogged disc 331 and the second cogged disc 332 (in the example the first cogged disc 331) is slidably associated, in the axial direction, to the respective portion 31,32 of the steering column 30 and is movable from a reciprocal position of contact between the second cogged disc 32 and the first cogged disc 332 (in the example the second cogged disc 332) to a position of no-contact, in contrast with return means, for example a resilient means such as a spring 333.

The clutch 33 also comprises an electromagnet 334 able to act on at least one of the first cogged disc 331 and the second cogged disc 332 (in the example the first cogged disc 331), so that, if electrically activated, it brings the at least one of the first cogged disc 331 and the second cogged disc 332 into the no-contact position.

In practice, in conditions of normal use, i.e. when it is electrically powered, the clutch 33 is maintained in the open configuration, i.e. with the cogged discs 331, 332 not in contact and, for example, the spring 333 compressed, in order to release the first upper portion 31 of the steering column 30 in rotation from the second lower portion 32 thereof.

The spring 333 is configured to engage the clutch when the electromagnet 334 is no longer electrically powered, in practice making the first upper portion 31 solid in rotation with the second lower portion 32.

A first electric motor 315 is positioned on the first upper portion 31, for example associated coaxially to a portion of the first upper portion 31 axially interposed between the end projecting from the box-shaped casing 20 and the first cogged disc 331 and arranged within the box-shaped casing 20 (for example, the first upper portion 21 thereof).

In practice, the first electric motor 315 comprises an external stator solidly constrained in rotation to the box-shaped body 20 and an internal rotor solidly constrained in rotation to the first upper portion 31 of the steering column 30.

A first angular position sensor 316 is positioned on the first upper portion 31, for example an encoder-type sensor.

A torque sensor 317 is positioned on the first upper portion.

A second electric motor 325 is positioned on the second lower portion 32, for example coaxially associated to a portion of the second lower portion 32 interposed axially between the end projecting from the box-shaped casing 20 and the second cogged disc 332 and arranged internally of the box-shaped casing 20 (for example of the second lower portion 22 thereof).

In practice, the second electric motor 325 includes an external stator solidly constrained in rotation to the box-shaped body 20 and an internal rotor solidly constrained in rotation to the second lower portion 32 of the steering column 30.

A second angular position sensor 326 is also positioned on the second lower portion 32, for example an encoder-type sensor.

The system 10 comprises at least an electronic control unit 34,35 operatively connected to at least the first angular position sensor 316, the second electric motor 325, the second angular position sensor 326 and the clutch 33, so as to command the rotating activation of the second electric motor 325 for rotation by a second predetermined rotation angle of the second lower portion 32 in response to a rotation of a first predetermined rotation angle (also different from the second) of the first upper portion 31, when the clutch 33 is open.

The electronic control unit 34,35 is advantageously operatively connected also to the first electric motor 315, so as to command the rotating activation of the first electric motor 315 so as to rotate the first upper portion 31 in response to a rotation by a predetermined rotation angle of the second lower portion 32, when the clutch 33 is open and/or to modify the resistance offered to the rotation of the first upper portion 31 imposed by the steering wheel 310.

The electronic control unit 34,35 is also operatively connected to the clutch 33 so as to keep it open under normal operating conditions of the vehicle and allow it to close mechanically (under the action of the spring 333) in case of malfunction, damage, engine off or, in general, in predefined and preset failure conditions.

In the embodiment shown, the system 10 comprises a first electronic control unit 34 operatively connected to the first angular position sensor 316, so as to detect the angular position of the first upper portion 31 with respect to a first presettable zero position.

For example, the first zero position is settable so that the writing or logo on the steering wheel 310 is properly directed towards the driver's seat in the vehicle, i.e. is legible when read from the driver's seat of the vehicle (perpendicular to the advancement direction when the vehicle is running in a straight direction).

The first electronic control unit 34 is also operatively connected to the first electric motor 315, so as to command activation thereof.

The first electronic control unit 34 is further operatively connected to the torque sensor 317.

The first electronic control unit 34 is also connected to the clutch 33, so as to activate opening thereof in normal operating conditions of the vehicle.

The system 10 further comprises a second electronic control unit 35 operatively connected to the second angular position sensor 326, so as to detect the angular position of the second upper portion 32 with respect to a presettable second zero position.

Further, the second electronic control unit 35 is operatively connected to the detection sensor 520 of the steering angle, so as to detect the exact steering angle of the wheels 51 compared to the predetermined angular reference position thereof.

All the functions of the first and second board 34,35 may also be implemented by a single electronic control unit.

The electronic control unit 34,35 (first and second) is configured so that the first zero position of the steering wheel 310 is set at the predetermined reference angular position of the vehicle wheels 51, where the wheels 51 are straight.

The second electronic control unit 35 is also operatively connected to the second electric motor 325, so as to command activation thereof.

Further, the second electronic control unit 35 operatively connected to the first electronic control unit 34.

In practice, the second electronic control unit 35 is configured to control the drive of the second electric motor 325 so as to rotate the second lower portion 32 by a second angle relative to the second zero position, in response to detection of the first electronic control unit 34 of a rotation of a first corner of the first upper portion 31 compared to the first zero position.

At the same time the first electronic control unit 34 is configured so as to activate the first electric motor 315 so as to provide resistance to rotation of the first upper portion 31, greater than the mechanical resistance (offered by the mechanical connections of the organs in reciprocal motion) to which it is normally subject.

For example, the first electronic control unit 34 is configured so as to vary the value of the resistance offered by the first electric motor 315 as a function of vehicle speed in forward motion, for example by increasing mechanical resistance as the velocity increases or passing between a level of lower resistance and a greater resistance on exceeding a vehicle speed that is greater than a given set reference value.

Further, the first electronic control unit 34 is configured so as to control the activation of the first electric motor 315 so as to rotate the first upper portion 31 by a first angle with respect to the first zero position, in response to the activation by the second electronic control unit 35 in a rotation by a second angle of the second portion 32 that is smaller than the second zero position, for example in conditions of reverse motion of the vehicle or in certain settable motion conditions of the vehicle.

In particular, the electronic control unit 34,35 is configured so as to return the steering wheel 310 into the first zero position (via the first electronic control unit 34 which commands the first electric motor 315) and return the wheels 51 into the reference angular position thereof, i.e. straight, (via the second electronic control unit 35 that controls the second electric motor 325), for example when the vehicle is in reverse motion (for example, in the initial stages of reverse motion).

The hydraulic power steering system 40 includes a housing 41 in which a single gerotor 42 is contained, i.e. a special volumetric pump described below in more detail.

The gerotor 42 is activated in rotation directly by the second lower portion 32 of the steering column 30; in practice, the free end of the second lower portion 32 enters the box-shaped casing 41 and is solidly connected in rotation to the gerotor 42.

The gerotor 42 is constituted by an internal gear 421 (rotor) and an external gear 422 (the stator), in which the internal gear 421 has a number N of teeth and the external gear 422 has a greater number of teeth, for example N+1 teeth. The internal gear 421 is offset from the external gear 422.

The shape of the internal gear 421 and the external gear 422 subdivides the volume interposed between them into a plurality of chambers (in number N) of different volumes and continuously variable during the rotation of the internal gear 421.

During the rotation cycle of the internal gear 421, inside the external gear 42, each of the volumes is continually changing, so that the volume of each chamber first increases and then decreases.

The free end of the second lower portion 32 enters the box-shaped casing 41 and is solidly connected, for example, to the internal rotor 421, for example by a connection or a sliding coupling or the like.

The box-shaped casing 41 comprises a pair of openings 410, one used for the exit of the pumped fluid when the gerotor 42 is activated in rotation in the clockwise direction (and inlet of fluid when the gerotor 42 is activated in rotation in the anticlockwise direction) and the other used for fluid outlet when the gerotor 42 is activated in rotation in an anticlockwise direction (and for inlet when the gerotor 42 is driven in rotation in the clockwise direction).

The box-shaped casing 41 further comprises an inlet 411 in communication with the internal volume of the gerotor 42 and controlled by a supply pump 43 of the fluid in supply to the hydraulic power steering system 40 and an outlet 412 which is also in communication with the internal volume of the gerotor 42 and coupled to a tank 44 of the fluid in supply to the hydraulic power steering system 40.

Each opening 410 of the pair of openings of the box case 41 is in fluid communication, for example by means of suitable pipes, with a respective passage opening 534 of the hydraulic cylinder 53, so that the rotation of the gerotor 42, in clockwise or anticlockwise direction, causes axial displacement of the piston 532, to the right or to the left, and consequently causes the steering of the wheels 51 to one side or the other.

The displacement of the gerotor 42 is advantageously substantially between 100 cc and 125 cc, by "cubic capacity" meaning the amount of fluid pumped by the gerotor 42 at each cycle of revolution.

Further, the displacement of the hydraulic cylinder 53 is for example comprised between 200 cc and 4000 cc, preferably between 800 cc and 2000 cc.

In practice, the torque at the steering wheel 310 enabling a steering in an emergency situation must be, as a rule, not more than 120+/−5 Nm.

A cubic capacity of the gerotor 42 of less than (or equal to) 125 cc generates, in an emergency, a fluid pressure at the outlet of an opening 410 of the pair of openings 410 of the box case that is substantially greater than 42 bar.

This pressure has been observed to be sufficient to allow steering in an emergency (i.e. only manual activation of the steering wheel 310) of any vehicle (heavy, with hydraulic cylinders 53 the total displacement of which is substantially between 200 cc and 4000 cc, as indicated above) without exceeding the maximum allowable torque of 120+/−5 Nm.

Preferably, the cubic capacity of the gerotor 42 is substantially between 63 cc and 125 cc, and still more preferably between 100 and 125 cc.

In the light of the above, the operation of the system 10 is as follows.

The electronic control unit 34,35 is operatively connected to the board 100 of the engine (ECU), which monitors and makes available a large number of indicative parameters of the vehicle, such as among others the direction of travel, the vehicle position, the advancement speed of the vehicle, the work tools in use on the vehicle, the type of work performed by the vehicle and other parameters, as is known to an expert in the sector.

In particular, the electronic control unit 34, 35 is configured so as to vary the conditions of the steering angle as a function of one or more of these parameters provided by the board 100.

During normal operation, with forward travel of the vehicle, the clutch 33 is open and the rotation of the gerotor 42 for the steering of the wheels 51 is delegated to the second electric motor 325 (with the help of the feed pump 43) which is driven in rotation by the second electronic control unit 35 in relation to the rotation (taken from the first angular position sensor 316 and from the first electronic control unit 34) imparted manually on the steering wheel 310 and, therefore, on the first upper portion 31 of the steering column 30.

In this configuration, the first electronic control unit 34, for example, actuates the first electric motor 315 so that the first electric motor 315 offers a differentiated resistance to the manually-imparted rotation, as a function of the advancement speed of the vehicle or other settable parameters, defining a greater drive comfort on the vehicle for the driver and/or the feeling of control of the steering system as if there were a direct connection between the steering wheel 310 and the wheels 51.

Following a clockwise rotation of the steering wheel 310, the gerotor 42 rotates clockwise and pushes the oil into one of the openings 410 for the power supply, for example, into the right chamber of the cylindrical sleeve 531 so as to enable the wheels 51 and therefore the vehicle to be steered towards the right; vice versa by turning the steering wheel in the anti-clockwise direction, as described above, steering to the left of the wheels 51 is obtained.

Additionally, where desired, the electronic control unit 34,35 can command the automatic realignment of the wheels 51 and the consequent return to the first zero position of the steering wheel 310 with the vehicle moving, for example when the operator releases the steering wheel 310.

In practice, the second electronic control unit 35 commands the second electric motor 325 so as to activate the second lower portion 32 of the steering pinion 30, so that it rotates until the detection sensor 520 detects that the wheels 51 are straight (i.e. are in the angular reference position thereof); at the same time the first electronic control unit 34 commands the first electric motor 315 so as to actuate the first upper portion 31 of the steering pinion 30, so that it rotates until the first angular position sensor 316 detects that the steering wheel 310 has returned to the first zero position thereof.

In a case where the vehicle is proceeding in reverse motion, where desired the electronic control unit 34,35 can in this case too control the automatic realignment of the wheels 51 and the consequent return to the first zero position of the steering wheel 310 with the vehicle in motion.

In practice, the second electronic control unit 35 commands the second electric motor 325 so as to activate the second lower portion 32 of the steering pinion 30, so that it rotates until the detection sensor 520 detects that the wheels 51 are straight (i.e. are in their reference angular position); at the same time the first electronic control unit 34 commands the first electric motor 315 so as to activate the first upper portion 31 of the steering pinion 30, so that it rotates until the first angular position sensor 316 detects that the steering wheel 310 has returned to the first zero position thereof.

Further, where faults are detected by the electronic control unit 34,35 (for example but not exclusively, power steering system failures, insufficient hydraulic power steering system pump pressure, lack of electrical supply to the motors, etc . . . ), this generates an alarm or failure signal (this can happen for example also as a function of parameters such as the absence of electrical power or the vehicle engine off).

In a circumstance of failure, the power supply to the electromagnet 334 ceases and the clutch 33 instantly closes.

With the clutch 33 closed the manual force exerted on the steering wheel 310 is the only force capable of moving the system 10.

In practice, the first upper portion 31 of the steering column 30 is solid in rotation with the second lower portion 32 and the rotation imposed by the steering wheel 310 results in a rotation of the second lower portion 32 and, therefore, of the gerotor 42.

Owing to the way it is dimensioned for the displacement of the gerotor 42, the torque exerted by the rotation of the steering wheel 310 on the steering column 30 is such as to generate a pressure sufficient to allow manual steering safely (without the aid of the second electric motor 325).

For example, the electronic control unit 34, 35, in cooperation with the command unit of the engine 100, can be configured for activation of an automatic driving function of the vehicle.

In particular, in response to a detection signal of the exact position of the vehicle (for example equipped with a position detection system such as a GPS or equivalent system), deriving from the command unit of the engine 100, the electronic control unit 34, 35 can control at least one of the first electric motor 315 or the second electric motor 325, so as to control the steering of the vehicle wheels while the electronic control unit of the engine 100 commands the advancement of the vehicle itself (in forward and/or in reverse motion).

For example, the automatic drive function set by the electronic control unit 24,25 and the board of the engine 100 can be switched off whenever the operator manually commands the steering, via the activation of the steering wheel 310.

The invention as it is conceived is susceptible to numerous modifications and variants, all falling within the scope of the inventive concept.

Further, all the details can be replaced by other technically-equivalent elements.

In practice, the materials used, as well as the contingent shapes and dimensions, can be any according to requirements, without forsaking the scope of protection of the following claims.

What is claimed is:

1. A steering system (10) comprising a steering wheel (310), a steering column (30), provided with a first portion (31) associated to the steering wheel (310) and on which a first electric motor (315) and a first angular position sensor (316) are positioned, and a second portion (32), on which a second electric motor (325) and a second angular position sensor (326) are positioned, and a clutch (33) interposed between the first portion (31) and the second portion (32), wherein the second portion (32) is associated to a hydrostatic steering unit (40) able to command a steering of a vehicle following a rotation imparted on the steering wheel (310) selectively by means of activating the second electric motor (325) when the clutch (33) is open or directly by means of the clutch (33) when the clutch is closed, the system further comprising an electronic control unit (34, 35) operatively connected at least to the first angular position sensor (316) and to the second electric motor (325). wherein the electronic control unit (34, 35) is operatively connected to the first electric motor (315) and configured so as to command the first electric motor (315) to rotate the steering wheel (310) with a respect to a predetermined zero position corresponding to the non-steered position of the wheels (51) of the vehicle.

2. The system (10) of claim 1, wherein the hydrostatic steering unit comprises at least a command unit (40) of the steering comprising a single gerotor (42) able to supply a fluid into at least a hydraulic piston (53) commanding the steering of the vehicle.

3. The system (10) of claim 2, wherein the gerotor (42) has a cubic capacity that is not greater than 125 cc.

4. The system (10) of claim 2, wherein with the clutch (33) closed the steering column (30) activates the gerotor (42) in rotation by mechanically connecting the gerotor (42) for manual command of the steering.

5. The system (10) of claim 2, wherein the hydraulic piston (53) is a double-acting piston and comprises a pair of chambers which can be filled selectively following a respective clockwise rotation and an anti-clockwise rotation of the second portion (32) of the steering column (30).

6. The system of claim 2, wherein the hydraulic piston (53) has a cubic capacity comprised between 200 cc and 4000 cc.

7. The system (10) of claim 6, wherein the hydraulic piston (53) has a cubic capacity comprised between 800 cc and 2000 cc.

8. The system (10) of claim 1, wherein the electronic control unit (34, 35) is configured such as to command the activating of the second electric motor (325) so as to rotate the second portion (32) as a function of a manual rotation of the first portion (31) of the steering column (30) imparted on the steering wheel (310).

9. The system (10) of claim 1, wherein the electronic control unit (34, 35) is configured such as to command the activating of the second electric motor (325) for rotating the second portion (32) as a function of a functioning parameter of the vehicle.

10. The system (10) of claims 1, wherein the electronic control unit (34, 35) is operatively connected to the first electric motor (315) and configured so as to generate a differentiated mechanical resistance to rotation of the first portion (31) as a function of at least a functioning parameter of the vehicle.

11. The system (10) of claim 1, wherein a torque sensor (317) is positioned on the first portion (31).

12. The system of claim 1, further comprising a detection sensor (520) of a steering angle of the wheels (51) of the vehicle.

13. The system of claim 1, wherein the electronic control unit (34, 35) is operatively connected to at least one of a torque sensor (317), which is positioned on the first portion (31) and a detection sensor (520) of a steering angle of the wheels (51) of the vehicle, for commanding the steering of the wheels of the vehicle by activating the second electric motor (325).

* * * * *